United States Patent [19]

Ando et al.

[11] 4,188,785
[45] Feb. 19, 1980

[54] FLUID COUPLING

[75] Inventors: Masahisa Ando, Aichi; Keigo Kato, Toyota; Masami Yamazaki, Toyota; Tetsuro Akagi, Toyota, all of Japan

[73] Assignee: Toyota Jidosha Kogyo Kabushiki Kaisha, Toyota, Japan

[21] Appl. No.: 893,437

[22] Filed: Apr. 4, 1978

[30] Foreign Application Priority Data

Jan. 7, 1978 [JP] Japan .................................. 53-366

[51] Int. Cl.$^2$ ............................................ F16D 31/00
[52] U.S. Cl. ...................................... 60/325; 60/337; 60/456; 60/494; 192/58 B; 192/82 T
[58] Field of Search ................ 60/325, 329, 330, 337, 60/456, 459, 468, 494, DIG. 5; 192/58 B, 82 T; 64/26; 417/294

[56] References Cited

U.S. PATENT DOCUMENTS

| | | | |
|---|---|---|---|
| 3,150,491 | 9/1964 | Thomas | 60/329 |
| 3,613,847 | 10/1971 | Masai | 192/58 B |
| 3,690,428 | 9/1972 | LaFlame | 192/58 B |

*Primary Examiner*—Edgar W. Geoghegan

*Attorney, Agent, or Firm*—Kenyon & Kenyon

[57] ABSTRACT

Disclosed is a fluid coupling which includes: a housing being used as a rotary driving member; a rotor rotatably mounted in the housing and being used as a driven member, a fluid pump having a pump chamber defined between the housing and the rotor; a fluid inlet port and a fluid outlet port; and a fluid circulation passage between the chamber and the housing, such that fluid in the pump circulates from the fluid circulation passage into the pump chamber through the inlet port and from the pump chamber through the outlet port into the fluid passage. The fluid coupling further includes: a fluid lock mechanism consisting of a cylinder bore provided in the housing such that the axis of the cylinder bore is in the radial direction of the coupling; a governor-weight sealingly and slidingly disposed in the cylinder bore; a spring for urging the governor-weight in the radially inward direction; a first opening provided at the radially inward portion of the cylinder bore, and; a second opening provided at the side wall portion of the cylinder bore. The first and second openings are provided in the fluid circulation passage which communicates the fluid inlet port with the fluid outlet port.

8 Claims, 8 Drawing Figures

FLUID COUPLING

BACKGROUND OF THE INVENTION

This invention relates to a fluid coupling for transmitting rotary torque.

A cooling fan, such as used for cooling an engine of a motor vehicle, is driven by the engine. However, when the rate of engine revolution is high, the fan provides more cooling air flow than is necessary. Therefore, a fluid coupling is mounted between the engine and the cooling fan, so that the fan is not rotated more than a prescribed rate of revolution when the rate of engine revolution is over a predetermined value. A conventional fluid coupling of this type uses fluid, such as silicone oil, and is so constructed that when the rate of engine revolution is low, it transmits rotary torque directly from an engine to a cooling fan. However, when the rate of engine revolution is higher than a predetermined value, the rotary resistance of the cooling fan increases over a predetermined value and the driven side (cooling fan) of the fluid coupling slips, and therefore, the conventional coupling does not transmit rotary torque higher than the predetermined rate. In such a conventional fluid coupling there are some disadvantages, such as, oil with high viscosity and stability is required. Because this type of coupling depends on the viscosity of the oil, the maximum rate of revolution of the driven side (cooling fan) is not maintained at a constant value, and the driven side (cooling fan) follows and rotates with the drive side when the rate of engine revolution is high.

SUMMARY OF THE INVENTION

The principal object of this invention is to provide a fluid coupling which does not contain the drawbacks described above, that is to say, a fluid coupling which does not require high viscosity oil and in which the rate of revolution of the driven side thereof is maintained at a constant value when the rate of revolution of the driving side thereof is over a predetermined value.

Another object of this invention is to provide a fluid coupling in which, when the rate of revolution of the driving side thereof is over a predetermined value, the torque transmission to the driven side is interrupted.

A further object of this invention is to provide a fluid coupling in which rotary transmission is controlled in accordance with the environmental temperature, in addition to the rate of revolution of the driving or the driven side of the fluid coupling.

The above-mentioned objects of the present invention will be readily evident from the following description with reference to the accompanying drawings, in which.

DESCRIPTION OF THE PREFERRED EMBODIMENTS

Figure 1:
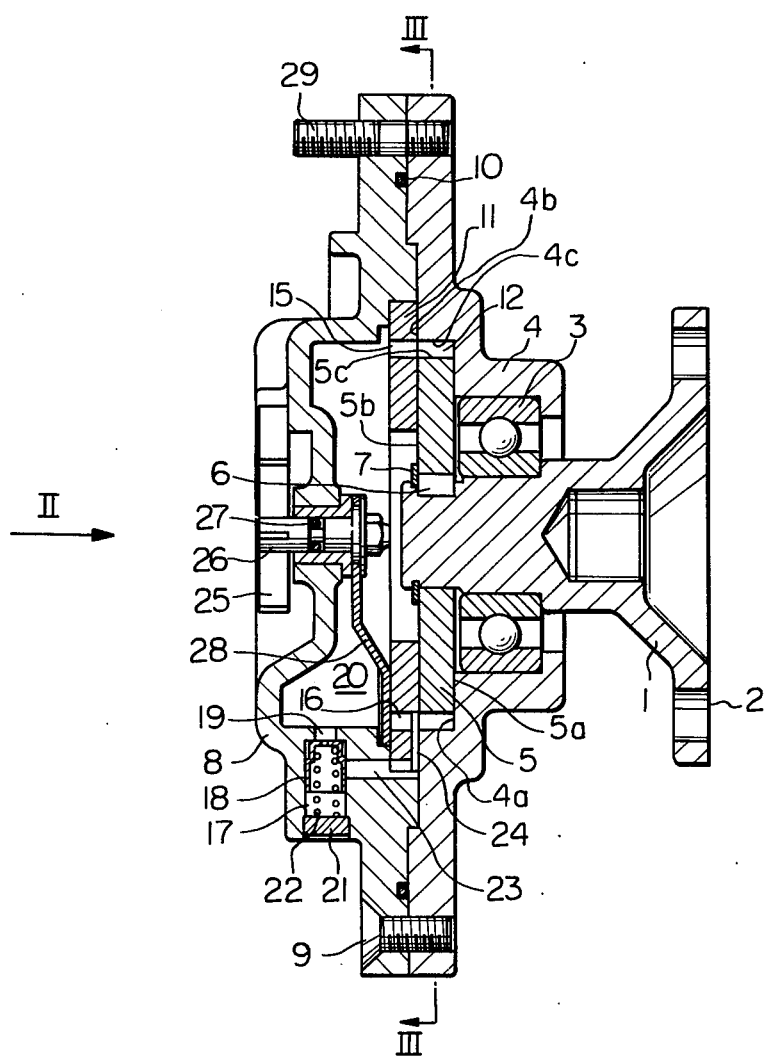
FIG. 1 is a cross-sectional view taken along line I—I in FIG. 2 and illustrates a fluid coupling of a first embodiment of this invention.
Figure 2:
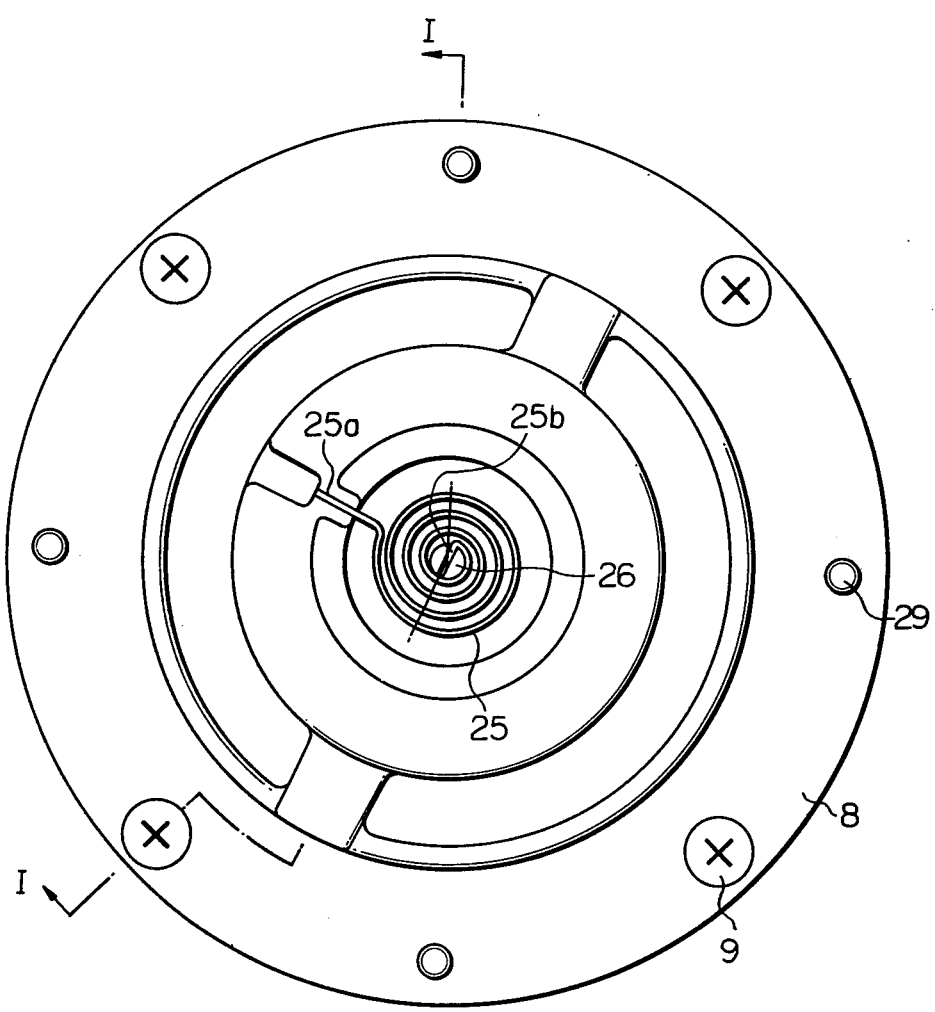
FIG. 2 is a front view of the fluid coupling seen from an arrow II in FIG. 1.
Figure 3:
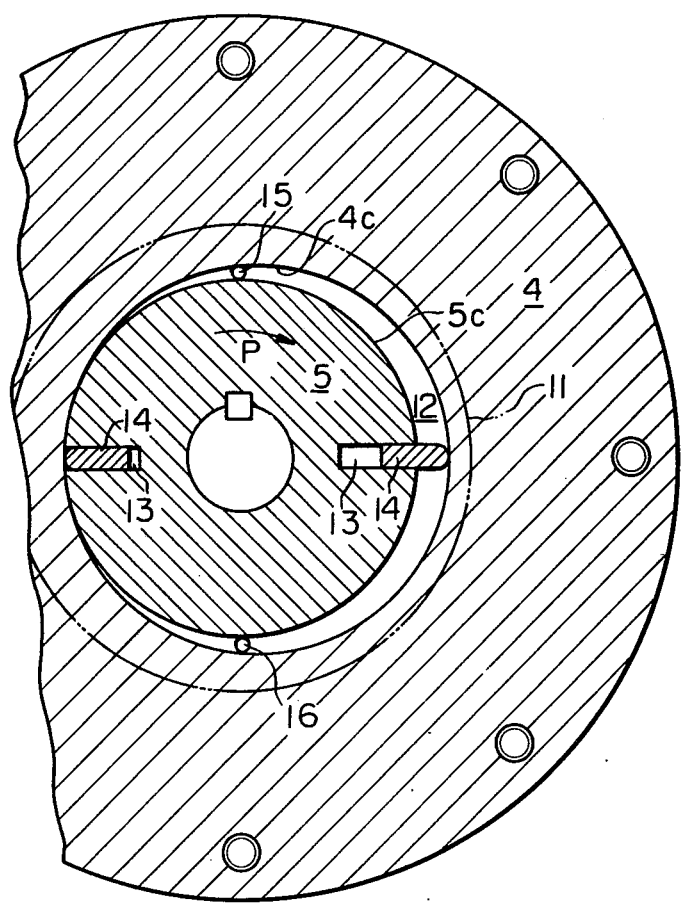
FIG. 3 is a cross-sectional view taken along line III—III in FIG. 1.

Referring now to FIGS. 1 through 3, a flanged rotary driving shaft 1 has a plurality of bolt holes by which the shaft can be mounted on a suitable rotary driving means (not shown), such as a pulley driven by an engine through a fan belt. The shaft is inserted into a ball bearing 3 which is recieved in a rear housing 4. Therefore, the shaft 1 rotatably supports the rear housing 4. A rotor 5 is fitted and fixed to the shaft 1 by a key 6 and an E shaped ring 7. A right side (in FIG. 1) surface 5a of the rotor 5 sealingly contacts a side wall surface 4a of the rear housing 4.

Referring again to FIG. 1, a front housing 8 is sealingly fixed to the rear housing 4 by a plurality of anchoring screws 9. An O-ring 10 provided between the housings 4 and 8 serves as a seal therebetween. A side plate 11 is fixedly positioned between the front housing 8 and a side wall surface 4b of the rear housing 4 so that the right side surface (in FIG. 1) of the side plate 11 sealingly contacts a left side surface (in FIG. 1) 5b of the rotor 5.

As will be understood from FIGS. 1 and 3, an inner circumferential surface 4c of the rear housing 4 and an outer circumferential surface 5c of the rotor 5 are eccentrically positioned with respect to each other, so that an arch shaped fluid pump chamber 12 is defined therebetween and between the side wall surface 4a of the rear housing 4 and the side plate 11. The fluid pump chamber 12 forms part of a well-known vane pump. As shown in FIG. 3, the rotor 5 has plural slots 13, each of which has a vane 14 inserted therein. The vane 14 is capable of being slidingly moved in the outward radial direction from the outer circumferential surface 5c of the rotor 5 by the rotary centrifugal force of the rotor 5. Therefore, when the rotor 5 rotates, an outer end of each vane 14 contacts the inner circumferential surface 4c of the rear housing 4. In FIGS. 1 and 3, the side plate 11 has a fluid inlet port 15 and a fluid outlet port 16, each of which communicates with the pump chamber 12.

In FIG. 1, the front housing 8 has a cylinder bore 17 formed therein, the axis of which is in the radial direction of the coupling. A plunger-like governor weight 18 is sealingly, slidingly and radially disposed in the cylinder 17. The governor weight 18 defines a first fluid lock means. The radially inner end portion of the cylinder 17 is communicated through a fluid port 19 formed in the front housing 8 to a fluid chamber 20 formed between the front and rear housings 8 and 4. The radially outer end of the cylinder 17 is tightly closed by a cover member 21. A compression spring 22 is disposed between the governor weight 18 and the cover member 21. The compression spring 22 urges the governor weight 18 in the radially inward direction. When the housings 4 and 8 rotate, the governor weight 18 slidingly moves radically outward against the compression spring 22. A fluid port 23 is provided in the front housing 8 and communicates with the cylinder 17 at a side wall portion of the cylinder 17. This fluid port 23 is also connected to the fluid outlet port 16 through a fluid passage 24 formed in the side plate 11.

In FIGS. 1 and 2, a heat detecting device is mounted on the front housing 8 at the outside thereof. As will be understood from FIG. 2, the heat detecting device includes a spiral bimetallic member 25. The outer end 25a of the bimetallic member 25 is fixed to the front housing 8 and the inner end 25b thereof is fixed to the outer end of a shaft 26. In FIG. 1, the shaft 26 is rotatably supported on the front housing 8 so that the axis thereof coincides with the axis of the shaft 1. A seal ring 27 serves to seal the shaft 26 fluid tightly. A lever valve member 28 is attached to the inner end of the shaft 26. The lever valve 28 acts at one end thereof to open or close the fluid outlet port 16. The lever valve 28 constitutes a second fluid lock means because, although the fluid inlet port 15 is always opened to the fluid chamber 20, the fluid outlet port 16 is, however, closed by the action of the bimetallic member 25 and the lever valve 28 when the temperature is high and opened to the fluid chamber 20 when the temperature is low. A cooling fan (not shown) can be mounted to the housing of this fluid coupling by means of stud bolts 29 shown in FIGS. 1 and 2.

The operation of a fluid coupling of the first embodiment of this invention will now be described. In the fluid coupling shown in FIGS. 1 through 3, the shaft 1 is a member of the rotary driving side and the housings 4 and 8 are members of the rotary driven side. The shaft 1 is rotated by a suitable driving means, such as an internal combustion engine, and the rotor 5 fixed to the shaft 1 is rotated in the direction of an arrow P shown in FIG. 3. The vanes 14 are projected radially outwardly, due to the rotational centrifugal force of the rotor 5, and slidingly move along the inner circumferential surface 4c of the rear housing 4. Fluid in the pump chamber 12, generally silicone oil, flows to the fluid chamber 20 through the fluid outlet port 16.

When the temperature of the housings 4 and 8 is low, the fluid outlet port 16 is opened as described above. The fluid in the pump chamber 12 flows into the fluid chamber 20 through the fluid outlet port 16, and the fluid in the fluid chamber 20 flows into the pump chamber 12 through the fluid inlet port 15; therefore, the fluid circulates between the pump chamber 12 and the fluid chamber 20. In this case, the rotor 5 freely rotates in the rear housing 4; consequently, rotary torque is not transmitted from the shaft 1 to the housings 4 and 8.

When the temperature of the housings 4 and 8 is high, the fluid outlet port 16 is closed by the lever valve 28 as described above. In this case, when the rate of revolution of the housings 4 and 8 is low, the centrifugal force exerted by the rotating governor weight 18 is not so large as to open the fluid port 23 by the governor weight 18. Therefore, the fluid port 23 stays closed, and the fluid in the pump chamber 12 is entirely locked therein, so that the housings 4 and 8 are rotated integrally with the shaft 1 and the rotor 5. As a result, a rotary torque is directly transmitted from the rotary driving side (shaft 1) to the rotary driven side (housings 4 and 8).

Figure 4:
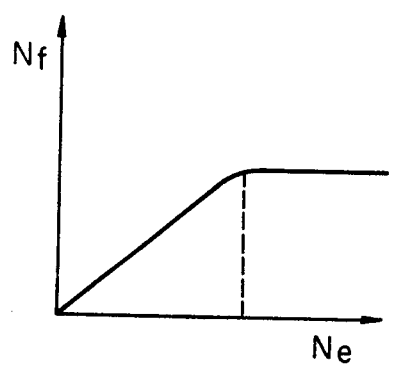
FIG. 4 is a diagram showing the relationship between the rate of the revolution of the driving side and that of driven side in a first embodiment of this invention.
Figure 5:
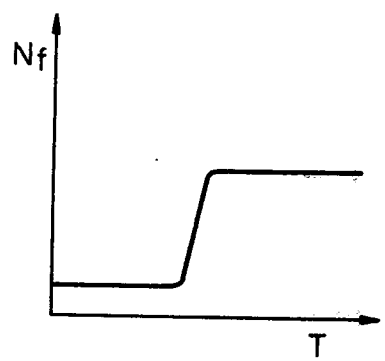
FIG. 5 is a diagram showing the relationship between temperature and rate of revolution of the driven side in the above-mentioned first embodiment.

When the rate of revolution of the housings 4 and 8 increases, the governor weight 18 moves radially outward against the compression spring 22 due to centrifugal force. Then, at the time when the rate of revolution is over a predetermined value, the fluid outlet and inlet ports 23 and 19 are communicated with each other. At this time, the fluid in the pump chamber 12 flows into the fluid chamber 20 through the fluid passage 24, the fluid port 23, cylinder 17 and the fluid port 19, and the fluid in the fluid chamber 20 also flows into the pump chamber 12 through the fluid inlet port 15, so that the fluid circulates between the fluid chamber 20 and the pump chamber 12. In this case, because the rotor 5 slips in the housing 4, rotary torque is not transmitted from the shaft 1 to the housings 4 and 8. When the rate of revolution of the housings 4 and 8 becomes lower than a predetermined value, the governor weight 18 is returned radially inward by the action of the spring 22, and the fluid port 23 is again closed by the governor weight 18. These relationships are shown in FIGS. 4 and 5. FIG. 4 shows the relationship between the rate of revolution (Ne) of the rotary driving side (shaft 1) and the rate of revolution (Nf) of the rotary driven side (housings 4 and 8). As will be understood from FIG. 4, when the shaft 1 rotates at a rate lower than a predetermined value, a rotary torque is transmitted directly from the shaft 1 to the housings 4 and 8. Contrary to this, when the shaft 1 rotates at a rate higher than the predetermined value, rotary torque is not directly transmitted to the housings 4 and 8, and the housings 4 and 8 are rotated at a constant rate. FIG. 5 shows the relationship between the temperature (T) and the rate of revolution (Nf) of the driven side (housings 4 and 8). When the temperature is low, rotary torque is not transmitted to the housings 4 and 8 regardless of the rate of revolution of these housings. A fluid coupling having characteristics as described above is suitable to be used as a fluid coupling for rotating a cooling fan of a radiator of a motor vehicle. Although the pump means is constructed as a vane pump in the embodiment described above, other types of pumps known in the art can be used, such as trochoid pumps, gear pumps or the like.

Figure 6:
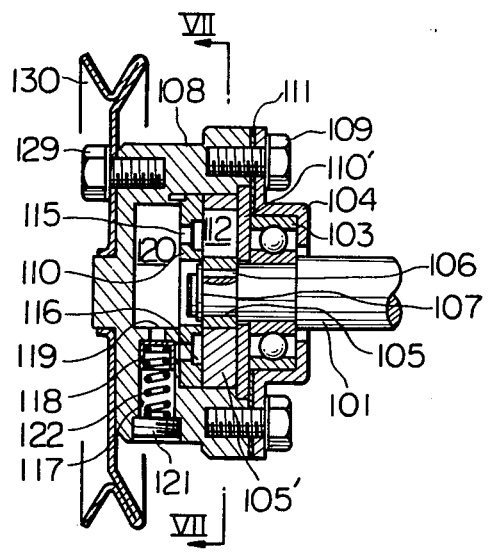
FIG. 6 is a cross-sectional view taken along line VI—VI in FIG. 7 and illustrating a fluid coupling of a second embodiment of this invention.
Figure 7:
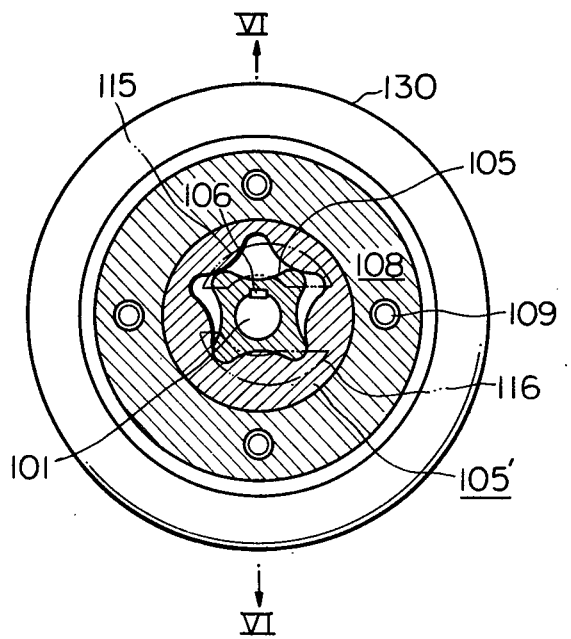
FIG. 7 is a cross-sectional view taken along line VII—VII in FIG. 6.

FIGS. 6 and 7 illustrate a second embodiment of a fluid coupling of this invention. FIG. 6 is a cross-sectional view taken along the line VI—VI in FIG. 7, and FIG. 7 is a cross-sectional view taken along the line VII—VII in FIG. 6. Although the shaft 1 and the rotor 5 were constructed as a rotary driving side and the housings 4 and 8 were constructed as a rotary driven side in the first embodiment shown in FIGS. 1 through 3, in this second embodiment, housings are constructed as a rotary driving side, and a shaft is constructed as a rotary driven side. In addition, a pump chamber is constructed as a trochoid pump.

In FIGS. 6 and 7, a shaft 101 is inserted into a ball bearing 103 which is received in a rear housing 104. Therefore, the shaft 101 is rotatably supported by the rear housing 104. An inner trochoid gear 105 is fitted to the shaft 101 and fixed thereto by a key 106 and a D-ring 107.

A front housing 108 is rigidly attached to the rear housing 104 by plural bolts 109. A seal 111 serves to seal the contacting surface between the housings 104 and 108. A pulley 130 on the rotary driving side is rigidly mounted on the front housing 108 by plural bolts 129 (only one bolt is seen in FIG. 6).

An outer trochoid gear 105' is so arranged that the outer circumferential surface thereof slidingly contacts the inner circumferential surface of the front housing 108. The inner and outer trochoid gears 105 and 105' are arranged so as to fluid tightly contact side plates 110 and 110' rigidly disposed in the housings 104 and 108. A fluid pump chamber 112 is defined between the two gears 105 and 105' and between the two side plates 110 and 110'. As illustrated in FIG. 7, the inner trochoid gear 105 has four trochoid gear teeth at the outer periphery thereof. The outer trochoid gear 105' has five trochoid gear teeth at an inner peripheral portion which is eccentric to the center axis of the trochoid gear 105'. Therefore, a known trochoid pump is defined by the trochoid gears 105 and 105'. The side plate 110 has arch-shaped fluid inlet and outlet ports 115 and 116 eccentrically arranged therein, each of which is communicated with the pump chamber 112.

In FIG. 6, a cylinder bore 117 is formed in the front housing 108 so that the axis of the cylinder bore 117 is in the radial direction of the fluid coupling. A plunger-like governor weight 118 is sealingly and slidingly disposed in the cylinder 117. The radially inner end portion of the cylinder 117 is communicated through a fluid port 119 formed in the front housing 108 with a fluid chamber 120 formed between the front housing 108 and the side plate 110. The radially outer end of the cylinder 117 is tightly closed by a cover member 121. A compression spring 122 is disposed between the governor weight 118 and the cover member 121. The compression spring 122 urges the governor weight 118 in the radially inward direction. When the housings 104 and 108 rotate, the governor weight 118 slidingly moves in the radially outward direction against the compression spring 122. A fluid outlet port 116 formed in the side plate 110 is connected to the cylinder 117 at the side wall portion of the cylinder 117.

The operation of a fluid coupling of the second embodiment of this invention will now be described. In this fluid coupling, the pulley 130 (affixed to housings 108 and 104) is a member of the rotary driving side and the shaft 101 is a member of the rotary driven side. The pulley 130 is rotated by a suitable driving means, such as an engine, through a belt (not shown).

When the rate of revolution of the housings 104 and 108 is low, the rotary centrifugal force exerted on the governor weight 118 is not so large as to open the fluid outlet port 116 by the governor weight 118. Therefore, the fluid outlet port 116 stays closed, and the fluid in pump chamber 112 is locked therein. As the fluid in the pump chamber 112 does not flow from the fluid inlet port 115 to the fluid outlet port 116, the inner trochoid gear 105 is entirely locked in the outer trochoid gear 105', and therefore, rotary torque is directly transmitted from the housings 104 and 108 to the shaft 101.

When the rate of revolution of the housings 104 and 108 increases over a predetermined value, the governor weight 118 is slidingly moved in the cylinder 117 in the radially outward direction, against the spring 122, by the action of centrifugal force and opens the fluid outlet port 116. In this case, the fluid in the pump chamber 112 flows through the fluid outlet port 116 into the fluid chamber 120, and the fluid in the fluid chamber 120 flows through the fluid inlet port 115 into the pump chamber 112, so that the fluid circulates by the action of the trochoid pump. As the fluid in the pump chamber 112 is not locked therein, the outer trochoid gear 105', with the outer peripheral surface thereof contacting the inner peripheral surface of the housing 108, rotates in the housing 108, so that a rotary torque is not transmitted from the housings 104 and 108 to the shaft 101.

Figure 8:
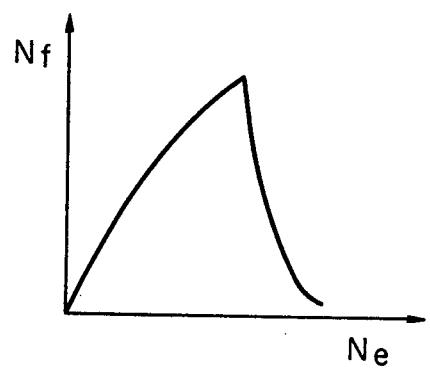
FIG. 8 is a diagram showing the relationship between the rate of revolution of the driving side and that of the driven side in the above-mentioned second embodiment of this invention.

The above described relationships are shown in FIG. 8. FIG. 8 shows the relationship between the rate of revolution (Ne) of the rotary driving side and the rate of revolution (Nf) of the rotary driven side. As will be understood from FIG. 8, when the rotary driving side rotates at a rate lower than a predetermined value, a rotary torque is directly transmitted to the rotary driven side. Contrary to this, when the rate of revolution of the rotary driving side increases over the predetermined value, the rotary torque transmission is interrupted, and the rate of revolution of the rotary driven side is abruptly decreased. A fluid coupling having such a characteristic as described above is suitable to be used as a coupling for a pump of a power steering device of motor vehicles, for example, in which device when the vehicle is running at low speed a steering force is increased in order to ensure easy operation of a steering wheel and when the vehicle is running at high speed the steering force is not increased.

Although the pump means is constructed as a trochoid pump in the second embodiment described above, other types of gear pumps known in the art can also be used. It is, however, impossible to use a vane pump, such as described in the first embodiment.

Although each of the embodiments described above is so constructed that the outlet port of the pump chamber is opened and closed, it is also possible to construct the device so that the fluid inlet port is opened and closed instead of the fluid outlet port. In such a case, quite the same effect would be obtained.

According to a fluid coupling of this invention, a fluid passage communicated with a pump chamber is entirely closed, so that high viscosity oil is not required and torque transmission is performed with stability and security. In addition, the rate of revolution of the rotary driven side may be maintained at a constant value, if desired.

What is claimed is:

1. A fluid coupling comprising: a housing being used as one of a rotary driving means and a rotary driven means, a rotor rotatably mounted in said housing and being used as the other of said rotary driving means and said rotary driven means, a fluid pumping means having a pump chamber formed between said housing and said rotor with a fluid inlet port and a fluid outlet port, and a fluid circulation passage formed between said chamber and said housing and communicating with said chamber through said inlet port and outlet port, so that fluid in said fluid pumping means circulates from said fluid circulation passage into said pump chamber through said fluid inlet port and from said pump chamber through said fluid outlet port into said fluid circulation passage, said fluid coupling further comprising:

a fluid lock means including a cylinder bore provided in said housing, the axis of said cylinder bore being in the radial direction of said coupling, a governor-weight sealingly and slidingly disposed in said cylinder bore, a spring means for urging said governor-weight in the radially inward direction, a first opening provided at the radially inward portion of said cylinder bore, and a second opening provided at the side wall portion of said cylinder bore, said first and second openings of said fluid lock means being provided in said fluid circulation passage which communicates said fluid inlet port with said fluid outlet port, and the governor-weight sealing communication between said first and second openings for rotational speeds of the housing below a predetermined value and opening communication therebetween at rotational speeds of the housing equal to or greater than said value.

2. A fluid coupling as set forth in claim 1, wherein said rotor is used as a rotary driving means, said housing is used as a rotary driven means, and said fluid pumping means comprises a vane pump.

3. A fluid coupling as set forth in claim 1, wherein said housing is used as a rotary driving means, said rotor is used as a rotary driven means and said fluid pump means is a gear pump, such as a trochoid gear pump.

4. A fluid coupling comprising: a housing being used as one of a rotary driving means and a rotary driven means, a rotor rotatably received in said housing and being used as the other of said rotary driving means and said rotary driven means, a fluid pumping means having a pump chamber formed between said housing and said rotor with a fluid inlet port and fluid outlet port, and a first fluid circulation passage connecting the outlet port to the inlet port so that fluid in said fluid pumping means circulates from said first fluid circulation passage into said pump chamber through said fluid inlet port and from said pump chamber through said fluid outlet port into said first fluid circulation passage, said fluid coupling further comprising:

a first fluid lock means including a cylinder bore provided in said housing, the axis of said cylinder bore being in the radial direction of said coupling, a governor-weight sealingly and slidingly disposed in said cylinder bore, a spring means for urging said governor-weight in the radially inward direction, a first opening provided at the radially inward portion of said cylinder bore and a second opening provided at the side wall portion of said cylinder bore, said first and second openings of said fluid lock means being provided in said fluid circulation passage which communicates said fluid inlet port with said fluid outlet port, and the governor-weight sealing communication between said first and second openings for rotational speeds below a predetermined value and opening communication therebetween at rotational speeds equal to or greater than said value; and a second fluid lock means including a second fluid circulation passage branched from said first fluid circulation passage so as to bypass said first fluid lock means, a sensor for detecting the temperature of said housing, and a valve means actuated by said temperature detecting means for closing and opening said second fluid circulation passage.

5. A fluid coupling as set forth in claim 4, wherein said sensor for detecting the temperature of the housing consists of a spiral shaped bimetallic member, the outer end thereof being fixed to said housing and the inner end thereof being connected to said valve means.

6. A fluid coupling as set forth in claim 4, wherein said valve means is so constructed as to close said second fluid circulation passage when said temperature detecting means detects that the temperature of said housing is greater than a predetermined temperature.

7. A fluid coupling as set forth in claim 4, wherein said rotor is used as a rotary driving means, said housing is used as a rotary driven means, and said fluid pumping means comprises a vane pump.

8. A fluid coupling as set forth in claim 4, wherein said housing is used as a rotary driving means and said rotor is used as a rotary driven means, and said fluid pump means is a gear pump, such as a trochoid gear pump.

* * * * *